(No Model.)
C. JAPTOK.
ASH SIFTER.
No. 334,172. Patented Jan. 12, 1886.
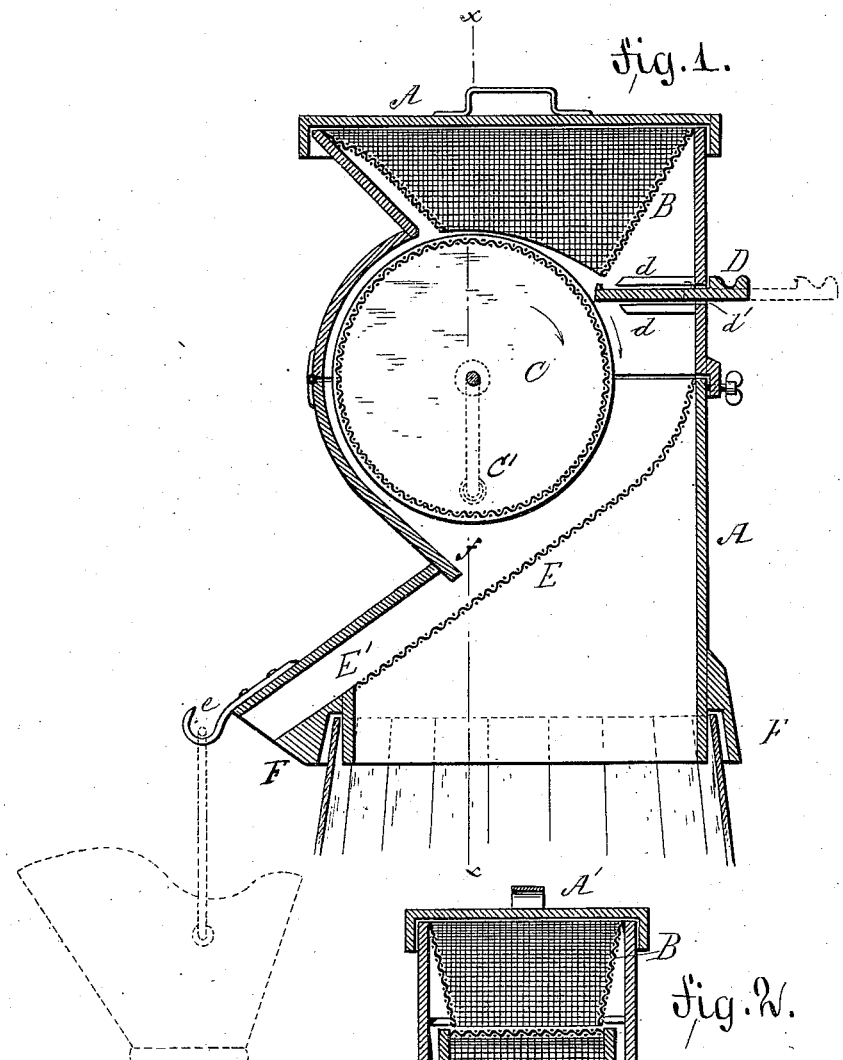
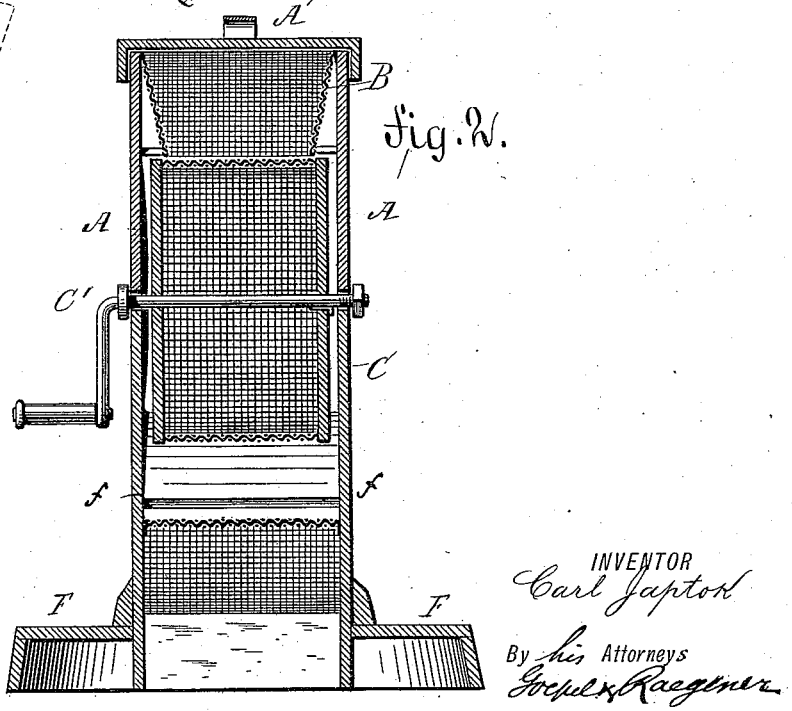
WITNESSES
INVENTOR
Carl Japtok
By his Attorneys

UNITED STATES PATENT OFFICE.

CARL JAPTOK, OF NEW YORK, N. Y.

ASH-SIFTER.

SPECIFICATION forming part of Letters Patent No. 334,172, dated January 12, 1886.

Application filed October 23, 1885. Serial No. 180,682. (No model.)

*To all whom it may concern:*

Be it known that I, CARL JAPTOK, of the city, county, and State of New York, have invented certain new and useful Improvements in Ash-Sifters, of which the following is a specification.

This invention relates to an improved ash-sifter that is designed to be used on the top of ash-barrels or other receptacles; and it embodies a casing made of two sections, said casing having a hopper at the upper part, a rotary screening-drum at the middle part below the hopper, and an inclined screen and discharge-spout at the lower part. A horizontally-guided gate below the hopper serves, when drawn out, to supply the ashes to the screening-drum and screen.

In the accompanying drawings, Figure 1 represents a vertical longitudinal section of my improved ash-sifter; and Fig. 2 is a vertical transverse section of the same on line $xx$, Fig. 1.

Similar letters of reference indicate corresponding parts.

A in the drawings represents the casing of my improved ash-sifter, which casing is made of wood, sheet metal, or other suitable material. The casing A is made of two sections, divided horizontally, and connected by hinges at one end and by a suitable locking device at the other end. The casing A is provided with a hopper, B, at the upper part, said hopper being preferably made of woven wire. A rotary drum, C, is arranged at the middle part of the casing, and formed of solid heads and a cylindrical body of woven wire. The drum C is keyed to a crank-shaft, C', that turns in journal-bearings in the side walls of the casing A. A horizontal gate, D, is guided by strips $d\ d$ and a slot, $d'$, in the end wall of the casing A, below the hopper B, and is pushed in toward the drum before the ash-sifter is to be charged with ashes, so that they are retained in the hopper and prevented from passing downward until the cover A' has been placed on the casing and the ash-pail hung to the suspension-hook $e$ at the lower part of the casing A. Below the drum C is arranged an inclined screen, E, which extends in a diagonally-inclined direction from one end of the casing to the other, and which forms, with the correspondingly-inclined end wall of the casing A, a discharge-spout, E'. The middle part of the casing A extends around the screening-drum C, and is inclined at the lower part, and provided with a deflecting-flange, $f$, that projects beyond the wall of the discharge-spout toward the screen, so as to throw the ashes and coal particles on the inclined screen. The casing A is provided with a circular base that corresponds in diameter with the barrel or other receptacle with which the ash-sifter is to be used, said base forming a closely-fitting cover for the barrel or other receptacle. By pulling the gate D in outward direction, as indicated in dotted lines in Fig. 1, and turning the screening-drum, the ashes are quickly passed through the screening-drum and an inclined screen, E, into the barrel, while the unburned coal particles are separated therefrom and conducted along the inclined screen to the discharge-spout E' and to the pail suspended from the hook $e$ at the end of the same. The rotations of the drum tend to throw the small lumps of coal with considerable force against the screen E, so that the same pass down over the screen, while the ashes drop through it into the barrel or other receptacle. A few turns of the drum suffice to separate the coal from the ashes, which is accomplished without permitting the escape of dust.

By making the casing of two parts the drum and other interior parts are readily accessible for cleaning or when any part of the ash-sifter has to be repaired.

Having thus described my invention, I claim as new and desire to secure by Letters Patent—

1. The combination of a casing having a hopper at the upper part, a screening-drum at the middle part, a horizontally-guided gate at one side of the hopper, and a diagonally-inclined screen and discharge-spout at the lower part, substantially as set forth.

2. The combination of a casing having a hopper at the upper part, a screening-drum at the middle part, a horizontally-guided gate at one side of the hopper, a diagonally-inclined screen and discharge-spout below the drum, and a circular cover at the base of the casing, substantially as set forth.

3. The combination of a casing having a hopper at the upper part, a screening-drum at the middle part, a horizontally-guided gate at one side of the hopper, a diagonally-inclined screen below the drum, a discharge-spout, and a deflecting-flange projecting from the middle part of the casing below the drum toward the screen, substantially as set forth.

In testimony that I claim the foregoing as my invention I have signed my name in presence of two subscribing witnesses.

CARL JAPTOK.

Witnesses:
  PAUL GOEPEL,
  MARTIN PETRY.